United States Patent [19]

Iwata et al.

[11] Patent Number: 4,637,245

[45] Date of Patent: Jan. 20, 1987

[54] KNOCK DERIVING APPARATUS FOR INTERNAL COMBUSTION ENGINES

[75] Inventors: Toshio Iwata; Atsushi Ueda, both of Himeji, Japan

[73] Assignee: Mitsubishi Denki Kabushiki Kaisha, Japan

[21] Appl. No.: 749,590

[22] Filed: Jun. 27, 1985

[30] Foreign Application Priority Data

Jun. 29, 1984 [JP] Japan ................................. 59-135718

[51] Int. Cl.$^4$ ............................................. G01L 23/22
[52] U.S. Cl. ..................................................... 73/35
[58] Field of Search ...................... 73/35; 123/425, 435

[56] References Cited

U.S. PATENT DOCUMENTS 3,822,583 7/1974 Keller et al. .............................. 73/35
4,111,035 9/1978 West et al. ................................ 73/35
4,346,586 8/1982 Furrey ...................................... 73/35

Primary Examiner—Stewart J. Levy
Assistant Examiner—John E. Chapman, Jr.
Attorney, Agent, or Firm—Leydig, Voit & Mayer

[57] ABSTRACT

A knock deriving apparatus for an internal combustion engine wherein only a knock signal is precisely derived from the output signal of a knock sensor including a noise signal component by the provision of first and second frequency filters serially connected to the knock sensor. The first frequency filter has a band width wider than that of the second frequency filter to cover a resonant noise. The resultant band width by the series combination of both filters is set to just cover a frequency band where knocks occur. The output of the first frequency filter is converted to a comparative reference signal which is compared in a comparator with the output of the second filter, thereby deriving a stable knock signal.

3 Claims, 13 Drawing Figures

FIG. 5
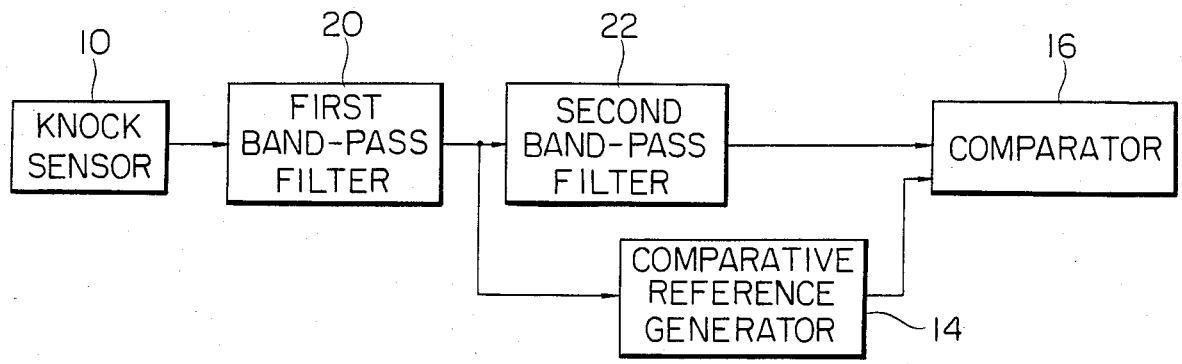
FIG. 6
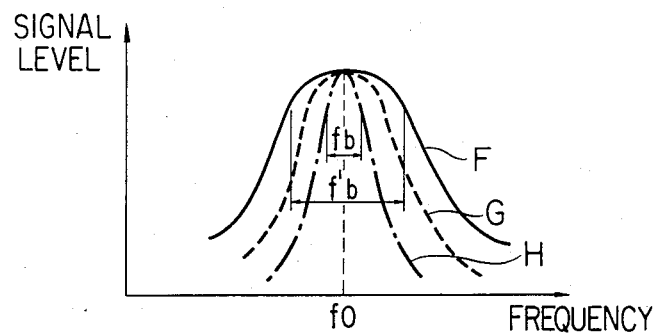
FIG. 7A
FIG. 7B
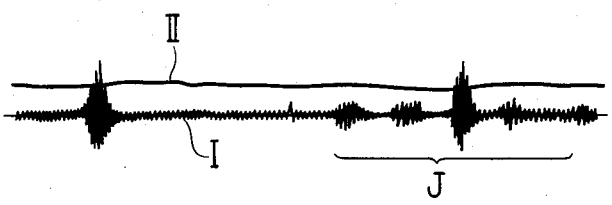
FIG. 7C
FIG. 7D

KNOCK DERIVING APPARATUS FOR INTERNAL COMBUSTION ENGINES

BACKGROUND OF THE INVENTION

This invention relates to a knock deriving apparatus for an internal combustion engine, and in particular to an apparatus for generating knock signals which are used in the control of the ignition timing of the engine.

As a method for detecting knocks arising in an internal combustion engine, it is generally known in the art to use such a method as, to detect mechanical engine vibrations, to detect the inner pressure of the combustion cylinders, or to detect sounds generated in the engine. Since these methods detect high frequency vibrations due to the occurrence of knocks by means of a detector mounted on or near the engine, the detector detects not only a knock signal component but also a noise signal component such as the mechanical vibrations of the engine and/or the variations in the combustion pressure of the engine. Therefore, in order to detect the occurrence of knocks, it is necessary to discriminate a knock signal from the output signal of the detector comprising the knock signal component and the noise signal component.

For the discrimination of the knock signal, a method using the characteristics of the knock signal is effective. For example, a knock signal is known to have a specific frequency component so that a method of discriminating, in frequency, the knock signal from a noise signal has been conventionally used.

FIG. 1 shows a frequency spectrum of an engine vibration signal detected in an engine, in which "A" indicates a spectrum portion where no knock occurs and "B" indicates a spectrum portion where knocks occur. It is seen from FIG. 1 that the portion "B" has a signal level higher than the portion "A" over a frequency band width fb about a frequency fo as a center. Therefore, by passing the above noted engine vibration signal through a band-pass filter having the band width fb with the central frequency fo, the noise signal component in the frequency band other than that of the knock signal component can be removed.

FIG. 2 shows a signal waveform as a function of time which has just passed the above noted band-pass filter, in which a portion "C" denotes a knock signal component having a high amplitude, and a portion "D" denotes a noise signal component having a damped, i.e. low amplitude because of the band-pass filter filtering out only a signal component within the above noted pass band. Accordingly, by the comparison of a comparative reference signal, which has a signal level which is higher than that of the noise signal component and is lower than that of the knock signal component, with the output signal of the band-pass filter, the knock signal component can be fully discriminated from the noise signal component, so that the knocks can be derived.

FIG. 3 shows a block arrangement of a prior art knock deriving apparatus, having such a discriminating function as noted above, which is described in the U.S. Pat. No. 3,822,583. In the figure, a knock sensor 10 for detecting knocks of an internal combustion engine is connected to a band-pass filter 12 which passes therethrough a frequency component specific to knocks in the output signal of the knock sensor 10. The output of the band-pass filter 12 is connected to the input of a comparative reference generator 14 which develops a comparative reference on the basis of the output signal of the band-pass filter 12. The outputs of the band-pass filter 12 and the comparative reference generator 14 are both connected to the inputs of a comparator 16 which compares the two signals.

In FIGS. 4A-4C are shown dynamic waveforms of the knock deriving apparatus shown in FIG. 3. The waveform shown in FIG. 4A shows the output signal of the knock sensor 10 in the case where an engine vibration sensor is employed as the knock sensor 10. As can be seen from this waveform, the knock signal is little different from the noise signal in amplitude so that no discrimination is possible based on the amplitudes thereof. A waveform I shown in FIG. 4B shows the output signal of the band-pass filter 12 which has a damped noise signal component as above described and, accordingly, has a good S/N ratio. A waveform II shown in FIG. 4B shows a comparative reference signal outputted by the comparative reference generator 14. It is to be noted that the comparative reference generator 14 may be formed of, for example, a rectifier circuit 141, a CR averaging circuit 142, and an amplifier circuit 143 as shown in FIG. 8, in which the output signal of the band-pass filter 12 shown by the waveform I in FIG. 4B is rectified and averaged to provide a DC signal which is then amplified at a predetermined amplification to provide the comparative reference.

The comparator 16 compares the output signal (waveform I) of the band-pass filter 12 with the output signal (waveform II) of the comparative reference generator 14. Since the above-mentioned amplification is set so that only the knock signal component may exceed the comparative reference, the comparator 14 outputs a pulse train as shown in FIG. 4C. Therefore, depending upon the presence or absence of the pulse train, as shown in FIG. 4C, outputted from the comparator 16, the occurrence of knocks can be detected.

However, should any of the mechanical parts in the engine produce a resonant noise which is at the same frequency as the knock frequency and has a large amplitude variation, since such a noise is detected by the knock sensor 10, a noise signal component having a large amplitude variation is outputted from the band-pass filter 12. Accordingly, the comparative reference signal outputted from the generator 14 varies to a large extent as the noise signal component varies. This state is shown by a portion "E" in FIG. 4B.

On the other hand, the U.S. Pat. No. 4,111,035, issued to G. A. West and G. C. Hamren on Sept. 5, 1978, entitled "Engine Knock Signal Generating Apparatus with Noise Channel Inhibiting Feedback" discloses a way to obtain such a comparative reference voltage on the basis of the output signal of a knock sensor i.e., not on the basis of the output signal of a band-pass filter.

However, such prior art apparatuses are disadvantageous in that if there is a noise source such as noted above, the comparative reference signal varies too much and it becomes difficult to precisely derive or generate the knock signal component.

SUMMARY OF THE INVENTION

It is accordingly an object of the present invention to provide a knock deriving apparatus for an internal combustion engine wherein only a knock signal is precisely derived from the output signal of a knock sensor including a noise signal component.

For this object, first and second frequency filters are serially connected to the knock sensor. The first bandpass filter has a frequency band width wider than that of the second bandpass filter to cover a resonant noise. The resultant band width based on the series combination of both filters is set to just cover a frequency band where knocks occur. The output of the first frequency filter is converted to a comparative reference signal which is compared in a comparator with the output of the second filter, thereby deriving a stable knock signal.

These filters may comprise band-pass filters which have the same central frequency of the pass band.

BRIEF DESCRIPTION OF THE DRAWINGS

FIG. 5 shows a block diagram of a knock deriving apparatus for an internal combustion engine according to one embodiment of this invention;

FIG. 6 shows the frequency characteristics of band-pass filters used in the arrangement shown in FIG. 5;

FIGS. 7A-7D show diagrams of dynamic waveforms obtained from various portions of the arrangement of the embodiment of this invention shown in FIG. 5; and, FIG. 8 shows a specific arrangement of a comparative reference generator used in FIGS. 3 and 5.

Throughout the figures, the same reference numerals indicate identical or corresponding portions.

DETAILED DESCRIPTION OF THE PREFERRED EMBODIMENT

Figure 1:
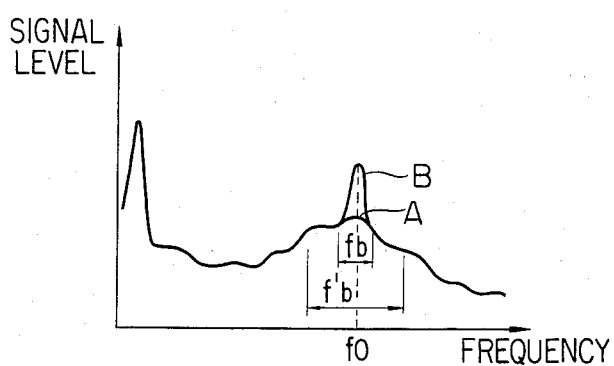
FIG. 1 shows a diagram of a frequency spectrum of a vibrating acceleration signal detected in an internal combustion engine.
Figure 2:
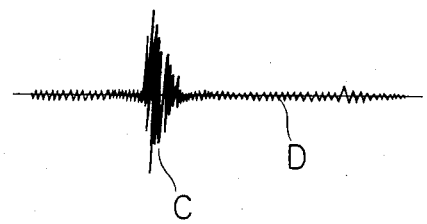
FIG. 2 shows a waveform diagram of the output signal of a band-pass filter.
Figure 3:
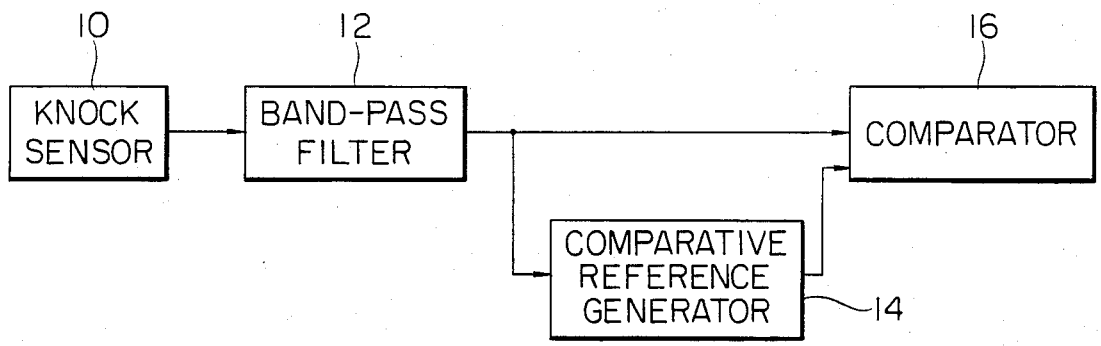
FIG. 3 shows a block diagram of a prior art knock deriving apparatus for an internal combustion engine.

This invention will now be readily apparent from the following detailed description of a preferred embodiment of a knock deriving apparatus for an internal combustion engine shown in the accompanying drawings.

In FIG. 5 showing an arrangement of one embodiment of this invention, the output of a conventional knock sensor 10 is connected to the input of a first band-pass filter 20 the output of which is in turn connected to the input of a second band-pass filter 22 as well as to the input of a conventional comparative reference generator 14. The outputs of the second band-pass filter 22 and the generator 14 are connected to the respective inputs of a conventional comparator 16.

In FIG. 6, there are shown a frequency characteristic "F" of the first band-pass filter 20, a frequency characteristic "G" of the second band-pass filter 22, and a resultant frequency characteristic "H" of the series combination of the first and the second band-pass filters 20 and 22. It is to be noted that the central frequencies of the frequency characteristics "F" and "G" are tuned to the knock frequency fo shown in FIG. 1. Also, the band width of the frequency characteristic "F" is set or adjusted to a wide pass band width f'b covering the pass band width f'b shown in FIG. 1. Furthermore, the band width of the frequency characteristic "G" is set or adjusted such that the pass band width of the resultant frequency characteristic "H" may assume the pass band width fb shown in FIG. 1. Consequently, the frequency characteristic of the second filter 22 is set intermediate between the characteristics "F" and "H".

Figure 4A:
FIGS. 4A-4C show waveforms derived from portions of the apparatus shown in FIG. 3.
Figure 4B:
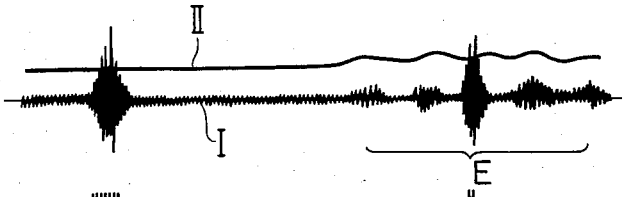
Figure 4C:
Figure 8:
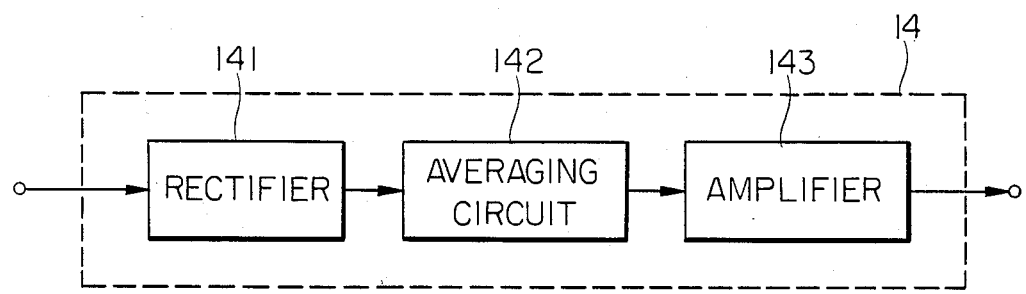

FIGS. 7A-7D show dynamic waveforms in the arrangement shown in FIG. 5. FIG. 7A shows the output signal of the knock sensor 10 in the same manner as shown in FIG. 4A, FIG. 7B shows the output signal of the first band-pass filter 20, and FIG. 7C shows the output signal of the second band-pass filter 22. The waveform in the left part other than portion J of FIG. 7C indicates a good S/N signal which is the same as the waveform of the output signal of the band-pass filter 12 shown in the left part other than the portion E of FIG. 4B. It is seen from the portion J of the waveform I in FIG. 7C that there arises a resonant noise as shown in the portion E of the waveform I in FIG. 4B.

However, because the first band-pass filter 20 has the wider pass band width f'b, the resonant noise of the output signal of the first band-pass filter 20 shown in FIG. 7B in the same time as the portion J in FIG. 7C is burried in, i.e. covered by the noise frequency component of the wider pass band f'b and so is not outstanding.

Therefore, even though the output signal of the second band-pass filter 22 shown by the waveform I in FIG. 7C varies in the amplitude thereof to a large extent due to the resonant noise, the comparative reference signal provided by the comparative reference generator 14 on the basis of the output signal of the first band-pass filter 20 is not affected by the above noted amplitude variation and assumes a stable value as shown by the waveform II in FIG. 7C.

Then, the output signal of the second band-pass filter 22 which has good sensitivity in regards to the knock signal and the comparative reference signal which has good stability even with respect to the mechanical resonant noise are compared at the comparator 16, whereby the occurrence of knocks can be accurately detected at all time as shown in FIG. 7D.

This knock signal discriminated serves to retard the ignition timing of the engine so that an optimum ignition timing may be realized at all times.

As set forth above, according to this invention, since a knock signal is sensitively derived with respect to its frequency characteristics from the output signal of the knock sensor and the comparative reference signal is stabilized even though the output signal includes a resonant noise, a precise knock detection can be effected at all times.

It is to be noted that while the present invention has been described with reference to the above embodiments illustrated in the accompanying drawings, it should not be limited to them and may be applied with various modifications thereof without departing from the spirit of the invention.

What we claim is:

1. A knock deriving apparatus for an internal combustion engine comprising:

a knock sensor responsive to vibrations of the engine producing an output signal containing a broad range of frequencies including a frequency component representing knocks in said engine;

a first frequency filter means having a bandwidth for passing a predetermined frequency component of the output signal of said knock sensor and producing a first filtered signal containing a range of frequencies which is wider than the frequency component representing knocks and includes frequencies representing engine noise including noise resonance frequencies near the knock frequency component;

a second frequency filter means having a narrower bandwidth than and connected to said first frequency filter means for passing the frequency component representing knocks received from said first frequency filter means while blocking frequencies representing engine noise, and producing an output;

a comparative reference generator connected directly to receive the first filtered signal of said first frequency filter means for generating a comparative reference signal representing the average of the first filtered signal produced by said first frequency filter means; and a comparator for comparing the outputs of said comparative reference generator and said second frequency filter means to derive said knocks.

2. A knock deriving apparatus for an internal combustion engine as claimed in claim 1 wherein the central frequencies respectively of said first and second frequency filter means are the same.

3. A knock deriving apparatus for an internal combustion engine as claimed in claim 2 wherein said second frequency filter means passes a frequency component intermediate between said predetermined frequency component and said frequency component of said knocks.

* * * * *